Patented June 21, 1932

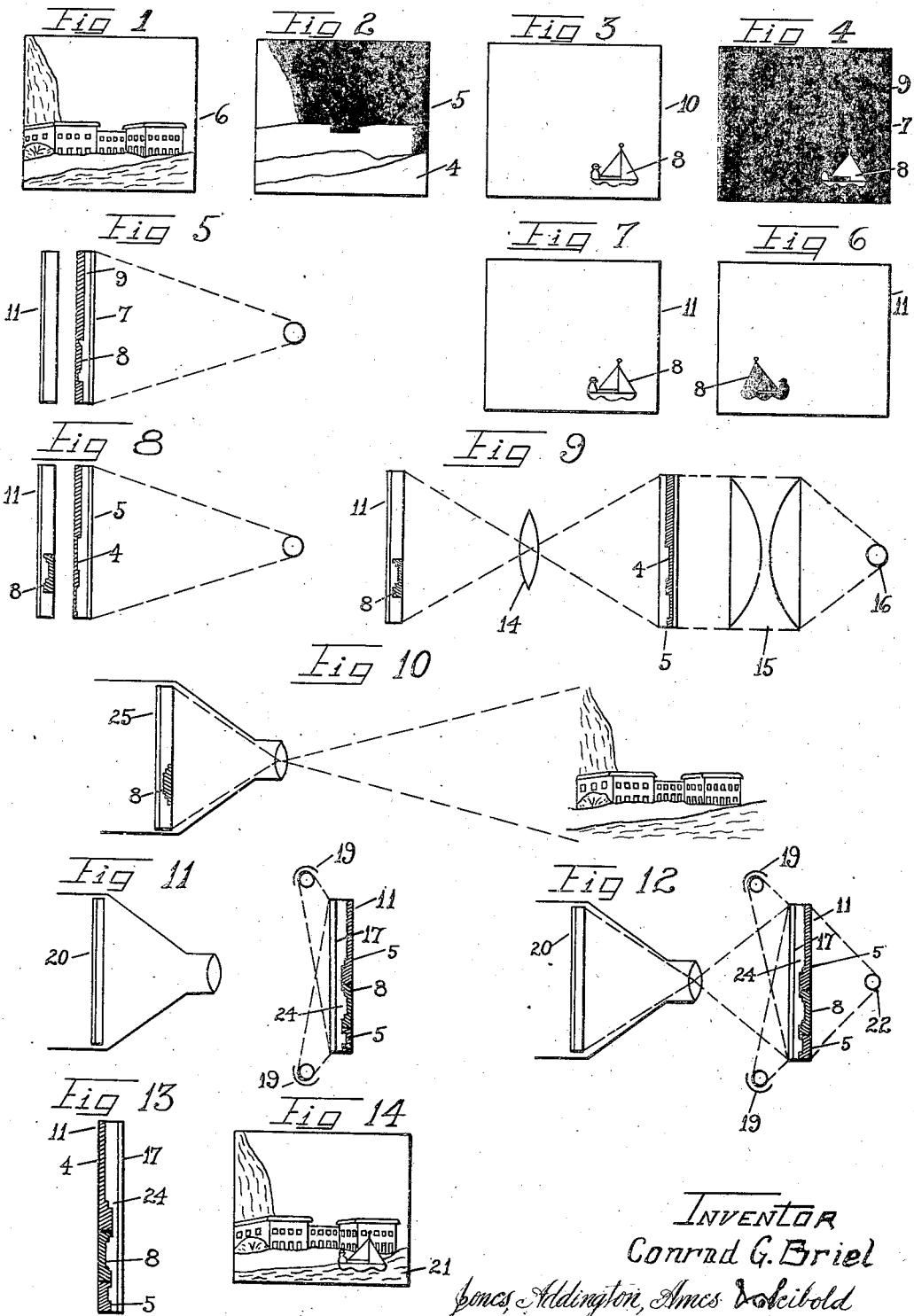

1,863,826

UNITED STATES PATENT OFFICE

CONRAD G. BRIEL, OF CHICAGO, ILLINOIS, ASSIGNOR TO CINEMA DEVELOPMENT COMPANY, OF CHICAGO, ILLINOIS, A CORPORATION OF ILLINOIS

METHOD OF PRODUCING COMPOSITE PICTURES

Application filed October 12, 1931. Serial No. 568,388.

This invention relates to a new and improved method of producing composite pictures in photography.

More particularly, the invention relates to a simple, accurate, rapid and inexpensive method of superposing one or more foreground images upon backgrounds whereby composite photographs may be produced entirely from previously taken films, or from a combination of previously taken films and objects, such as studio actions and background scenery, or directly from both studio actions and background scenery.

Specifically, the present invention is a radical departure from the methods heretofore employed. In co-pending application, Serial No. 169,173, filed February 18, 1927, the broad idea of producing composite photographs by single exposure is disclosed. A foreground, whether object or image, is used, which is opaque to and reflective of light, so that when superimposed upon a background and illuminated by transmitted and reflected light, the details of the foreground will appear upon the composite photograph as part of the background without the details of the background appearing through the foreground image. In the present method, instead of producing the composite photograph by a single exposure, I preferably expose the foreground and background separately, to a photographic film, but treat this film after it is first exposed to the foreground in a manner to secure opacity and light reflectivity of the foreground image, so that when this film is thereafter exposed to the background, the details of the background will not interfere with the details of the treated foreground image, but will be printed in the surrounding sensitive area. From this compound image film, I produce a final composite picture. It is not essential that the illumination include both transmitted and reflected light, as heretofore, because the step of treating the film after exposure eliminates the need of illumination by transmission and requires illumination by reflection only to illuminate the image details for photographing. This method possesses many advantages over methods formerly devised for the making of such composite pictures, most of which involve in some form or other either single exposure, as broadly disclosed and claimed in the aforesaid co-pending application, or what is known as double exposure, either by exposure of a photographic film first to the foreground object or subject, and then to the background, with the foreground object or subject illuminated from the rear only to appear as a silhouette during exposure to the background, or by successive printing exposures of a photographic film to previously taken photographs of the foreground and of the background, this particular method heretofore requiring the use of a travelling mat. Double exposure methods as thus practiced are slow, inaccurate and tedious to perform, resulting in imperfect composite pictures which evidence upon their completion that the foreground was not a part of the original background scene, this being highly undesirable because it lessens the value of the picture. The present method may be practiced to produce composite pictures accurately and speedily, without possible detection that the finished picture is the work of superimposing.

In order to apprise those skilled in the art how to practice my invention, I shall now describe several preferred embodiments thereof in connection with the accompanying drawing which forms a part hereof.

In the drawing:

Figure 1 is a front elevation of a positive background scene, the film being that usually employed in photography;

Fig. 2 is a negative of the background scene shown in Fig. 1;

Fig. 3 is a positive film of the foreground image;

Fig. 4 is a negative of the foreground image shown in Fig. 3;

Fig. 5 illustrates the first printing step of the method embodying the invention herein disclosed, which include over-exposing a photographic film to the negative foreground film;

Fig. 6 is the same over-exposed positive photographic film shown in Fig. 5 (looking at the emulsion side) after being treated in accordance with the teachings of the present invention to render the foreground image opaque to transmitted light;

Fig. 7 is the same over-exposed positive photographic film looking at the base or celluloid side, to illustrate that the details of the impressed image may be illuminated by reflected light;

Fig. 8 illustrates the second printing step involved in the method disclosed herein;

Fig. 9 illustrates the same step accomplished by projection printing;

Fig. 10 illustrates exposing to a natural background a photographic film having a treated negative foreground image;

Fig. 11 illustrates exposing a fresh actinic surface to a photographic film having a compound image impressed thereon in the manner herein described, the latter being illuminated by reflected light only;

Fig. 12 is a similar view wherein transmitted light may be used if found desirable;

Fig. 13 is an enlarged cross-sectional view illustrating how over-developing the compound image produces an opaque image which may be photographed by reflected light to show image details; and Fig. 14 is a front elevation of a composite or superposed positive picture.

The components used may be the usual black and white diapositives, such as the ordinary cinema projecting film, or plates used in still photography, or they may be paintings, depending upon the characters or images to be combined and the superimposing to be done, it being also understood that the actual background and foreground actions may be used as well as film or paintings.

When the extensively used present-day film is developed, images are formed by fixation of innumerable minute particles of metallic silver imbedded in the gelatin of the photographic emulsion, there being relatively more silver particles in the shadows than in the high-lights, but somewhat uniformly distributed throughout the depth of the photographic emulsion. The present invention is very well adapted to this type of photographic film, but it will be understood that the invention might well be applied to other film where the images are produced in a different manner, or have different physical characteristics.

As shown in the drawing, the background may be scenery or other objects in the form of a painting, or a photographic film transparency, and may be produced by making the necessary negative 5 having an image 4 thereon. A positive print 6 of negative 5 is shown in Fig. 1.

As a specific example, the foreground component 7 shown in Fig. 4 may be a negative of the foreground action preferably taken before a white screen or ground so that the impressed foreground image 8 upon film 7 will be surrounded by a silver deposit 9. A positive print 10 of negative 7 is shown in Fig. 3. By illustrating positive prints 6 and 10 of the background and foreground components, although the making of these positive prints is not necessary to and is not a step of the method disclosed, it will be apparent that, by practicing the method, a composite picture may be made wherein the details of the background component do not interfere with the details of the foreground component and the problem of halation about the foreground image is solved.

A print of foreground negative 7 may be made as shown in Fig. 5, and it is preferable that the photographic film 11 be slightly over-exposed in this step so that it may be developed deeply. This developing action is continued until the silver deposit throughout the depth of the foreground image 8, photographically impressed upon film 11 produces substantial opacity to transmitted light, as shown in Fig. 6, and the inner particles of metallic silver comprising the image are developed sufficiently to be varyingly reflective of light to show the image details on the celluloid side of the film, as shown in Fig. 7, and in a manner to be explained later. The developer, which may be any well known kind suitable for the purpose, may then be washed out and film 11 allowed to dry. If the developer exhibits a tendency to continue its action during the washing of the film, and this is found undesirable, then film 11 may be subjected to any well known stop bath before the washing.

Film 11, after being thus treated, is then exposed to a background component. In Fig. 8, I have illustrated exposure of film 11 by contact printing to background negative 5. However, this exposure of film 11 may be by projection printing, as shown in Fig. 9, in which case the background scene may be made larger or smaller or shifted from side to side merely by adjusting such parts as 11 and 14 as a unit with respect to parts 5, 15 and 16 as a unit, as well as the focusing; or it may be by the usual step of photographing where film 11 containing a negative foreground image will be exposed to natural background scenery, as shown in Fig. 10. Film 11 may be over-exposed, if so desired, when printing in the background component, and it may likewise be developed deeply until it shows the image details of the background impression plainly by reflected light on the celluloid side 17.

Film 11 is then washed to remove the developing re-agent and dried. If found desirable, film 11 may be subjected to a stop bath before washing in order to control the density of the metallic silver so that, as above stated, the image details will show plainly by reflected light on the celluloid side 17.

As shown in Fig. 11, film 11 may then be illuminated by reflected light, such as by one or more illuminators 19 and exposed to a fresh actinic surface 20 whereby a finished master negative will be produced and from which master negative any number of positive prints may be made showing the complete composite picture 21 shown in Fig. 14.

It may be desirable in certain cases to use transmitted light as shown at 22 in Fig. 12, in which case a certain amount of control of brilliancy is afforded for the background component.

It will be apparent that the method is not limited to two components to produce a composite picture, but any number of components may be suitably combined by exposing film 11 a number of times to different foregrounds or backgrounds.

One of the features of the present invention resides in making the images 4 and 8 on film 11 varyingly reflective of light to show their details when illuminated. This may be accomplished by controlling the developing action to produce a dense deposit of silver or a relatively dense deposit of silver (relative with respect to the remaining portions of the emulsion). I do not wish to be limited to the particular way this step of the invention is accomplished, but suggest, as one method of obtaining the desired results, not fixing the film 11 after developing so as to allow the undeveloped sensitive photographic material to remain, the density of this undeveloped sensitive photographic material varying to produce a varying reflectivity for light to effect correct reproduction of the image when photographed upon film 20.

In the event the ordinary photographic film is used wherein the images are formed by the fixation of innumerable minute particles of metallic silver imbedded in gelatin comprising the photographic emulsion, the undeveloped sensitive photographic material 24 may comprise an undeveloped silver salt, such as possibly a silver bromide of yellowish appearance. If different films are used, it will be apparent that the light reflective material remaining in the emulsion will be the equivalent of material 24. The broad concept of the present invention is intended to include such equivalent material, but I find that, specifically, the use of an undeveloped silver salt of light appearance or color produces remarkable results.

I also find that if image 8 is correctly exposed and developed on film 11, it is sufficiently opaque to prevent transmission of light to the layer of silver beneath at the time of exposing the background image 5 thereto, and consequently, no background image detail will be visible in a finished picture where a foreground action exists.

If it is found at any time that the foreground image has not been made sufficiently opaque to serve its purpose, the emulsion side may be subjected momentarily to a flash exposure and again developed, or the non-opaque area of the image may be coated with a black or non-actinic material.

The method disclosed is extremely flexible with regard to the selection of the type of components which may be used. Four separate combinations may be used satisfactorily: (a) A foreground made from a previously prepared foreground negative may be used with a background action prepared from a previously photographed background negative; (b) a treated negative foreground action made from a previously taken positive foreground action may be used with a natural background scene; (c) a natural foreground scene may be photographed, the film prepared and used directly with a previously taken background scene; (d) a natural foreground scene may be photographed, the film prepared and used directly with a natural background scene.

In connection with this latter arrangement of components, it may be mentioned that by using the present method, a complete composite picture may be made with the same amount of film now necessary to produce an ordinary photographic picture. This is effected by over-exposing a film 25 to foreground action positioned against a black or non-actinic screen, this producing a negative image on film 25 developing film 25 deeply, washing and then exposing this film to a natural background, as shown in Fig. 10, then again developing deeply to produce a somewhat dense image, washing and finally photographing it by reflected light onto a positive film. When developed, this positive film will be a composite positive picture 21, as shown in Fig. 14, of the natural components—only two films being required to produce this composite 21, to-wit: the reflective film 25 and the final positive 21.

It will be understood that the extent of the exposure of the foreground action will depend largely upon the character of the foreground action, and consequently, it may not be necessary to over-expose film 25 thereto but to give it an exposure producing a latent image which will have a density when developed sufficient to exclude transmitted light of the second exposure.

Opacity and deeply developing as used herein are merely relative terms. Consequently, by stating that the foreground image 8 on film 11 is treated to be opaque, I mean that this image 8 is provided with a density which is only sufficient to prevent the details of the background component from interfering with the details of this foreground image when film 11 is exposed to the background and developed. Accordingly, exposures of certain foreground actions may not require deep developing within the generally accepted meaning of the term, but only such developing as will produce the required result. Likewise, the term varying reflectivity is intended to mean treating the image 8 on film 11 in a manner to cause this image to show its details when photographed reflectively. It is not necessary that the background image on film 11 be given any treatment other than that which will give a density producing a light reflectivity sufficient to show its details by reflected light, or, on the other hand, to have the required contrast or balance with the foreground image when the treatment of film 11 is completed and ready for final use. The invention is not limited to the step of photographing by reflected light, as shown in Fig. 11. After film 11 is properly treated to produce images 4 and 8 of proper density balance, it may be further treated in any one of a number of ways to produce a final composite picture of images 4 and 8, including those methods hereinafter described or those described in copending application Serial No. 568,389, filed November 12, 1931.

While I have shown the various printing steps to involve printing with the emulsion sides facing each other, it will be understood that different positioning of the film may be had without departing from the scope of the invention.

As a variant of the present method, film 11, after having both foreground and background images photographically impressed thereon and developed deeply to provide sufficient density to obtain a varyingly reflective image on the base side, may be treated with a solution of potassium permanganate and sulphuric acid, or a solution of chromic acid, or equivalent solution, to remove the metallic silver. The film may be treated or positioned so as to provide for light absorption on the side opposite the reflective surface or that side of the film which is farthest away from the lens of the camera. If photographed in the manner shown in Fig. 11, a final composite picture 21, as shown in Fig. 14, may be made.

An additional variant may comprise removing the photographically impressed foreground and background images 8 and 4 of metallic silver by potassium permanganate and sulphuric acid, or equivalent solution, say chromic acid, in the manner above described, and thereafter treating the remaining silver bromide 24, which will have a somewhat deep reddish hue as the result of permanganate or equivalent solution, by an acid sulphite bath. This bath may continue for a time sufficient to clear the high lights of this silver bromide 24, but not sufficient to clear the shadows or half tones. In other words, the bath will clear the silver bromide near the surface of the emulsion side of film 11 but will not be permitted to penetrate a greater distance than is necessary to affect the silver bromide forming the high lights. I find that after film 11 is thus treated, it may be photographed, by reflected light, from the emulsion side thereof to produce a composite picture wherein the foreground and background images are well balanced, as regards lighting effects, and the exact contrast between the two obtained.

In the drawing, the photographic emulsion is shown considerably thicker in cross section than the celluloid base contrary to the actual proportions generally used in the ordinary photographic film; but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a composite photograph embodying two component parts which includes making a photographic impression of one component upon a sensitized film, developing the photographic impression to produce a mask thereof on one side of said film and on the other side of said film an image thereof varyingly reflective of light, exposing the other component to the mask side of said film, and treating the photographic impression of said other component to make it varyingly reflective of light.

2. The method of producing a composite photograph embodying two component parts which includes exposing a sensitized film first to one component, treating the film to make the photographic impression thereon of said component opaque to but reflective of light, then exposing the film to the other component, again treating the film to make the second photographic impression opaque to but reflective of light, illuminating said film by reflected light, and exposing a fresh antinic surface to said film.

3. The method of producing a composite photograph embodying two or more component parts which includes making a photographic impression of one component upon a sensitized film, treating the photographic impression to produce a mask thereof on one side of said film and on the other side of said film an image thereof varyingly reflective of light, exposing the other component to the mask side of said film, treating the photographic impression of said other component to make it varyingly reflective of light, reflectively illuminating said photographic images upon said film, and exposing a fresh actinic surface to said photographic images.

4. The method of producing a composite photograph comprising a foreground component superposed upon a background component which includes making substantially deeply developed photographic images of each component upon a sensitized film, leaving the undeveloped photographic material upon said film to make the said images varyingly reflective of light, and exposing a fresh actinic surface to the said images.

5. The method of producing a composite photograph comprising a foreground component superposed upon a background component which includes making substantially deeply developed photographic images of each component upon a sensitized film and utilizing the undeveloped photographic material, which remains after developing the film, to make the images varyingly reflective of light to show their details.

6. The method of producing a composite photograph embodying two or more component parts which includes exposing a sensitized film to one component, developing said film to produce an image which is substantially opaque to light, then exposing said film to the other component, developing said film to produce an image of the other component, the undeveloped photographic material on said film giving varying light reflectivity to said images, illuminating said images by reflected light, and exposing a fresh actinic surface to said images so illuminated.

7. The method of producing a composite photograph embodying two component parts which includes making a photographic silver deposit image of one component, developing the image to be substantially opaque to light on one side, the remaining undeveloped photographic material giving varying light reflectivity on the opposite side, making a photographic silver image of the other component, and utilizing the undeveloped photographic material to give varying light reflectivity to the second image.

8. The method of producing a composite photograph embodying a foreground component superposed upon a background component which includes making photographic silver deposit images of both components, developing the images sufficiently to be absorptive of light, the remaining undeveloped photographic material giving varying light reflectivity to the images, illuminating the images by reflected light, and exposing a fresh actinic surface to the images so illuminated.

9. The method of producing a composite photograph embodying a foreground component superposed upon a background component which includes making photographic silver deposit images of both components upon a sensitized film without removing the remaining undeveloped photographic material, treating the film to produce an image of undeveloped photographic material by removing the silver deposit, and making this image varyingly reflective of light to show its details.

10. The method of producing a composite photograph embodying two component parts which includes making photographic silver deposit images of both components upon a sensitized film, without removing the remaining undeveloped photographic material, making a reverse image of undeveloped photographic material by removing the silver deposit, and treating said film to provide a non-actinic backing on said film to make the reverse image varyingly reflective of light to show its details, illuminating the reverse image by reflected light, and exposing a fresh actinic surface to the reverse image.

11. A method of producing composite pictures embodying two component parts which includes making a deep photographic impression of the image of one component on a sensitive photographic emulsion, developing said photographic impression completely, deeply exposing those portions which are not made impervious to light by the image of the first component to the image of the other component, and finally developing completely.

12. A method of producing composite pictures embodying two component parts which includes exposing a sensitive photographic emulsion to light through a transparency of one component, developing the photographic impression to a density to exclude transmitted light, then exposing the area of the emulsion unprotected by the image of the first component to light through a transparency of the other component, and finally developing to produce a reflective composite of the two components on the surface of emulsion opposite the surface upon which exposure was made.

13. A method of producing composite pictures which includes developing an image of one component contained in a sensitive emulsion until relatively opaque to transmitted light but of varying density to correspond with its respective details; exposing the surrounding sensitive area not protected by the opaque image of the first component to the image of the second component, and finally developing.

14. A method of producing composite pictures embodying two component parts that includes developing in a light sensitive emulsion a varyingly light reflective image of one component of a density to exclude transmitted light, exposing the area not protected by said developed image to the image of the other component, and finally developing to produce a varying light reflective image of said other component.

15. The method of producing a composite photograph embodying two component parts which includes making a photographic impression of one component upon a sensitized film, treating the photographic impression to produce a mask thereof on one side of said film and on the other side of said film an image thereof varyingly reflective of light, exposing the other component to the mask side of said film, and deeply developing the photographic impression of said other component to make it varyingly reflective of light.

16. The method of producing a composite photograph embodying two component parts which includes exposing a sensitized film first to one component, treating the photographic impression of said component to make it substantially opaqued to but reflective of light, exposing said sensitized film to the other component, and treating the photographic impression of said other component to make it substantially opaque to but reflective of light.

17. The method of producing a composite photograph embodying two or more component parts which includes making an exposure of one component upon a sensitized film, treating the photographic impression of said component to produce an image varyingly reflective of light, making an exposure of the other component upon said sensitized film, and treating the photographic impression of the other component to produce an image varyingly reflective of light and photographically balanced with the first image.

18. The method of producing a composite photograph embodying two or more component parts which includes making an exposure of one component upon a sensitized film, developing the photographic impression of said component to produce an image varyingly reflective of light, making an exposure of the other component upon said sensitized film, and treating the photographic impression of the other component to produce an image varyingly reflective of light.

19. The method of producing a composite photograph embodying a foreground component superposed upon a background component which includes exposing a sensitized film to one component, treating the photographic impression to obtain a density excluding light of a second exposure, making a second exposure to the background component, and treating the photographic impression of the second exposure to obtain a density which with the remaining undeveloped photographic material will produce photographically balanced light reflective images of both components upon said film.

20. The method of producting a composite photograph embodying two or more component parts which includes making a photographic image of one component upon a sensitized film, treating said photographic image to be varyingly reflective of light to show its details by reflective light, making a photographic image of the other component upon said sensitized film, treating this photographic image of the other component to be varyingly reflective of light to show its details by reflective light, illuminating said sensitized film by reflected light, and exposing a fresh actinic surface to the photographic images.

21. The method of producing a composite photograph comprising a foreground component superposed upon a background component which includes producing upon a sensitized film a photographic image of the foreground component of a density sufficient to exclude transmitted light of a second exposure, making a second exposure of said sensitized film to the background component, and treating the resulting photographic impression of the background component to produce an image of a density corresponding to said density of said photographic image of the foreground component whereby a balanced composite picture of both components is obtained.

22. The method of producing a composite photograph comprising a foreground component superposed upon a background component which includes exposing a sensitized film to the foreground component, developing the photographic impression to a density sufficient to exclude transmitted light, exposing said sensitized film to the background component, and developing the resulting photographic impression of the background component to a density corresponding to said density of said photographic impression of the foreground component whereby a balanced composite picture of both components is obtained.

In witness whereof I have hereunto subscribed my name.

CONRAD G. BRIEL.